May 15, 1951     E. C. OLIVER     2,552,645
GRINDING MACHINE
Filed Sept. 24, 1945     6 Sheets-Sheet 1
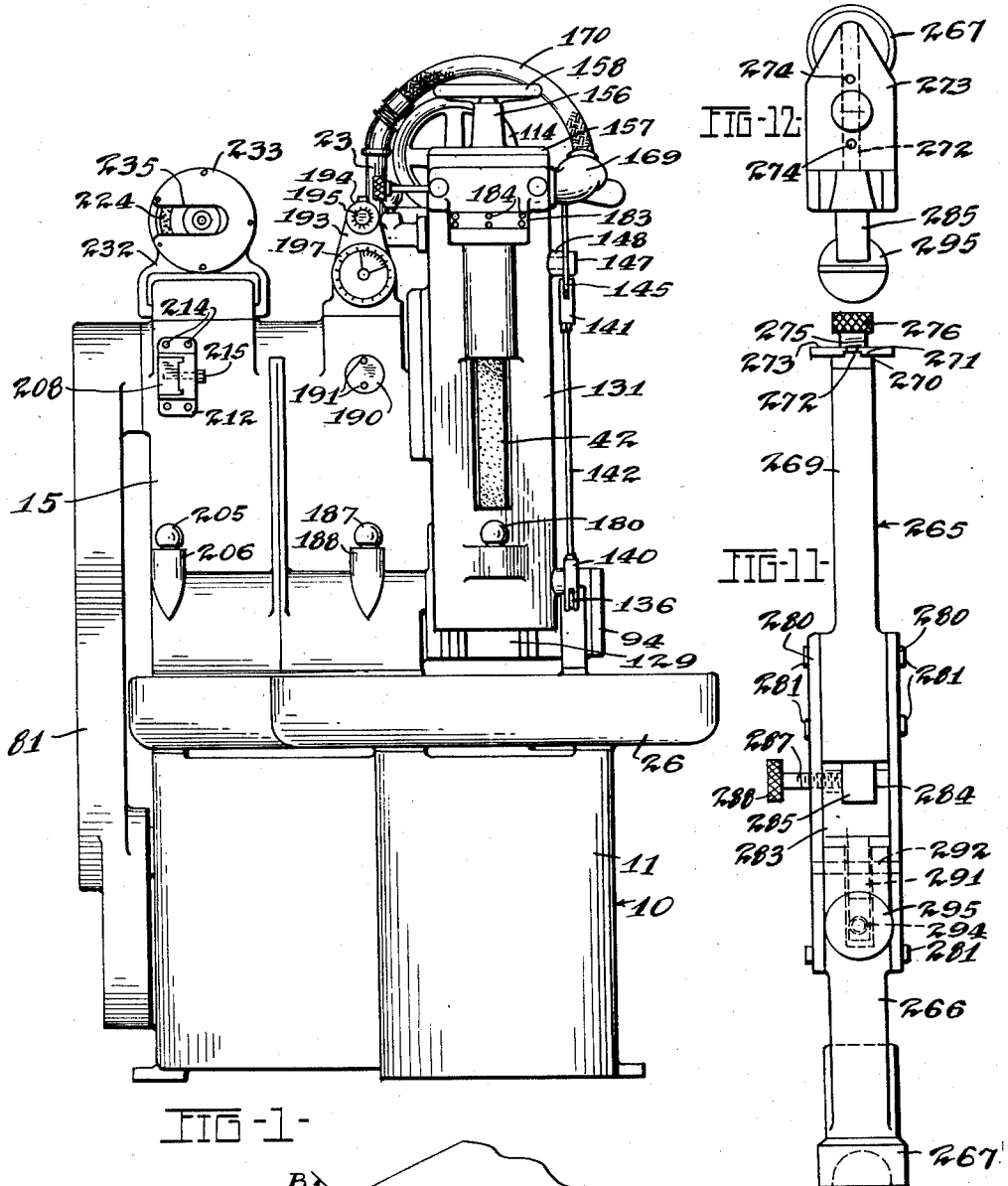
FIG-1-
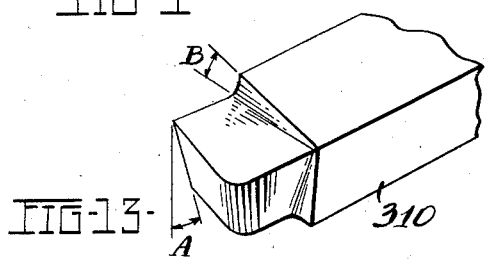
FIG-13-
INVENTOR.
EDD C. OLIVER
BY Harry O. Ernsberger
ATTORNEY.

May 15, 1951 E. C. OLIVER 2,552,645
GRINDING MACHINE
Filed Sept. 24, 1945 6 Sheets-Sheet 2
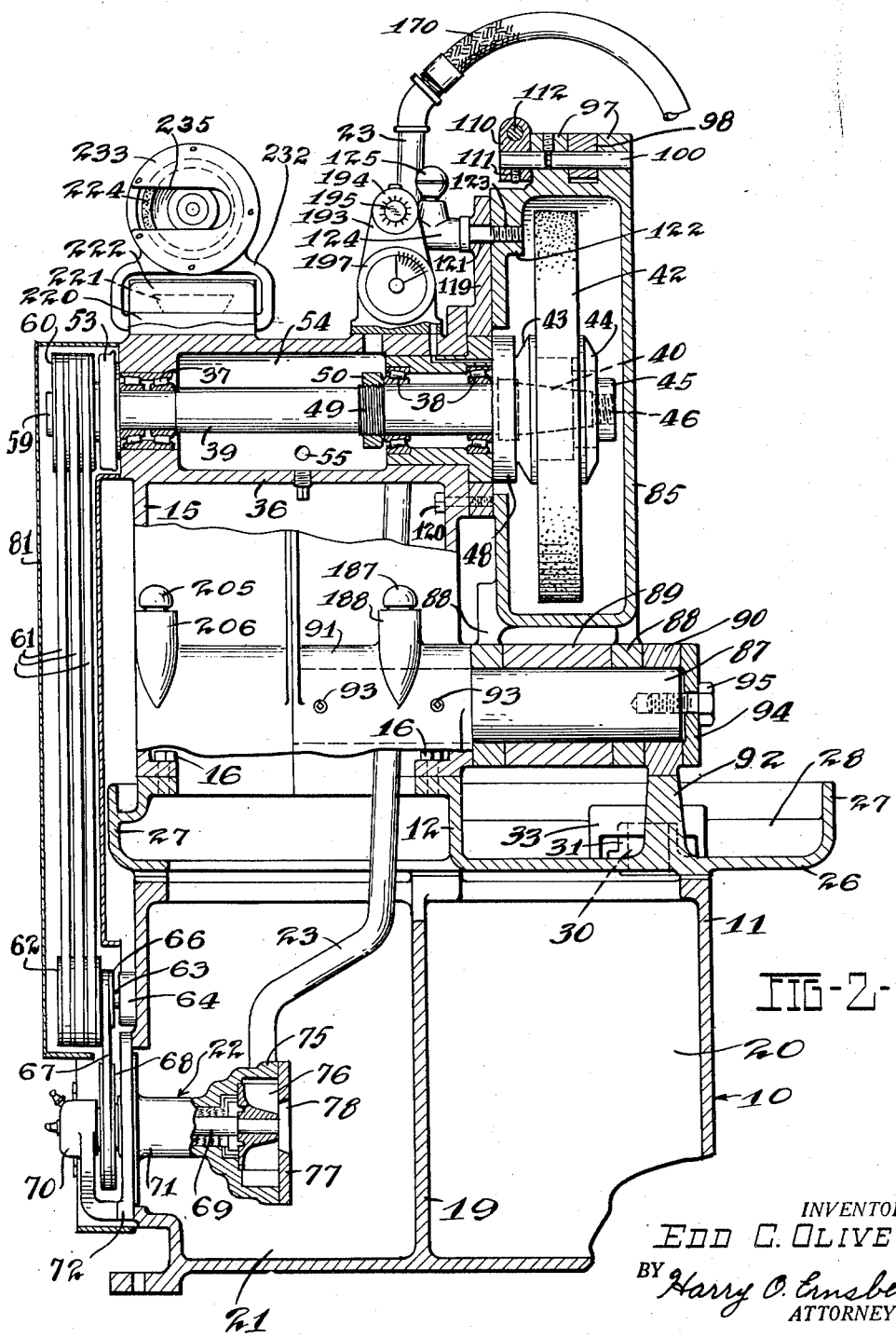
FIG-2-
INVENTOR.
EDD C. OLIVER
BY Harry O. Ernsberger
ATTORNEY

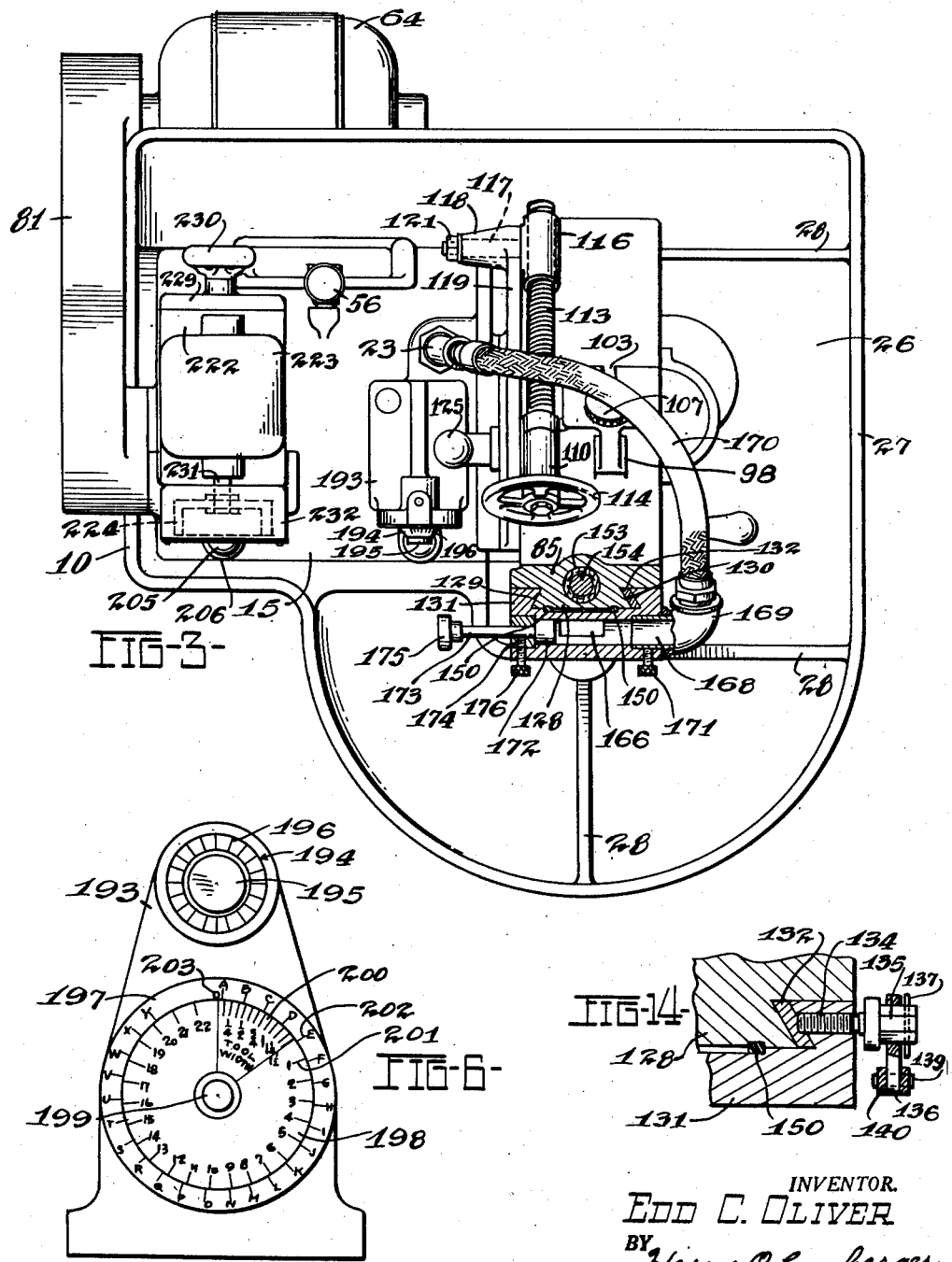

May 15, 1951
E. C. OLIVER
2,552,645
GRINDING MACHINE
Filed Sept. 24, 1945
6 Sheets-Sheet 4
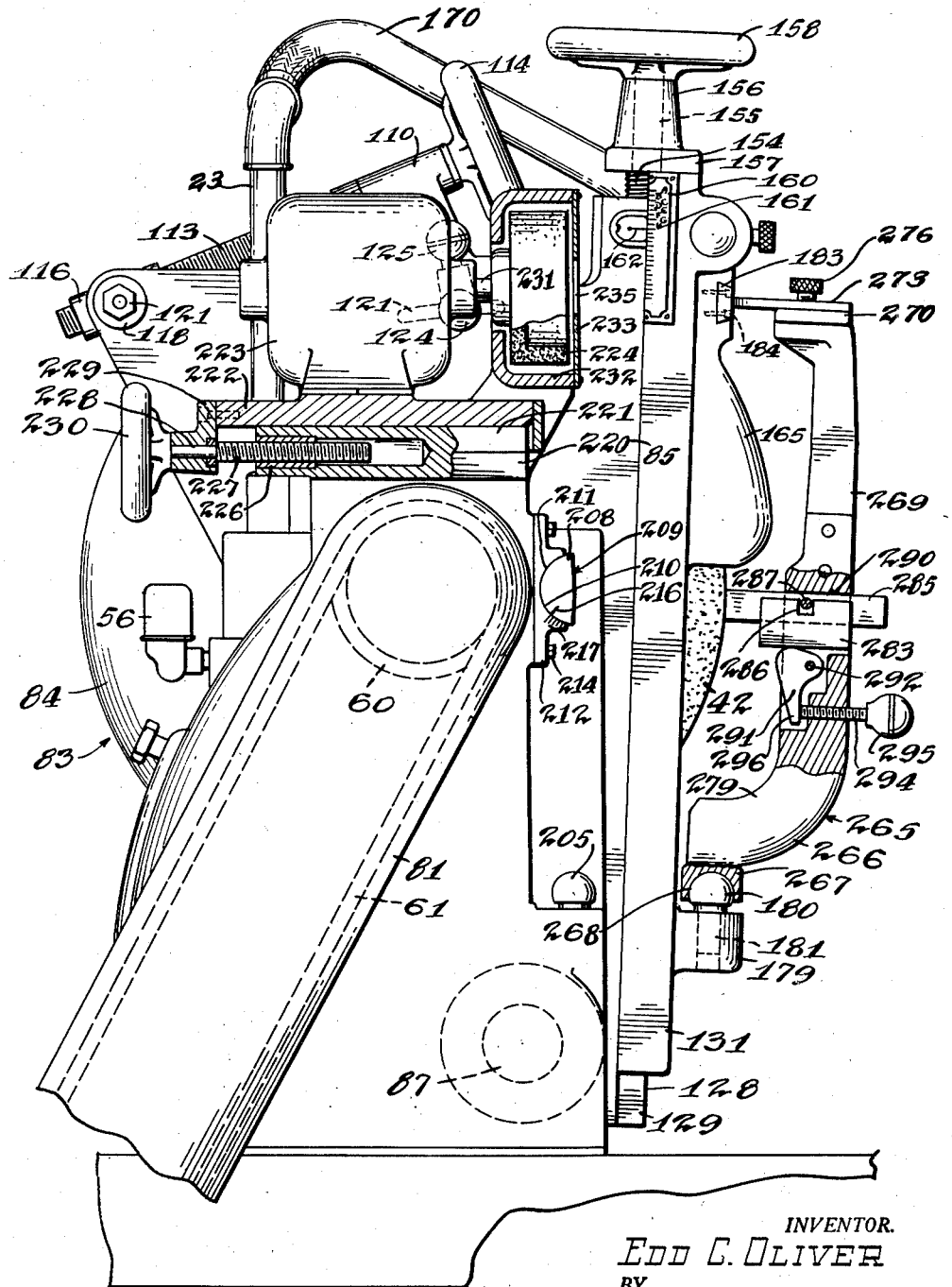
FIG-4-
INVENTOR.
EDD C. OLIVER
BY Harry O. Ernsberger
ATTORNEY.

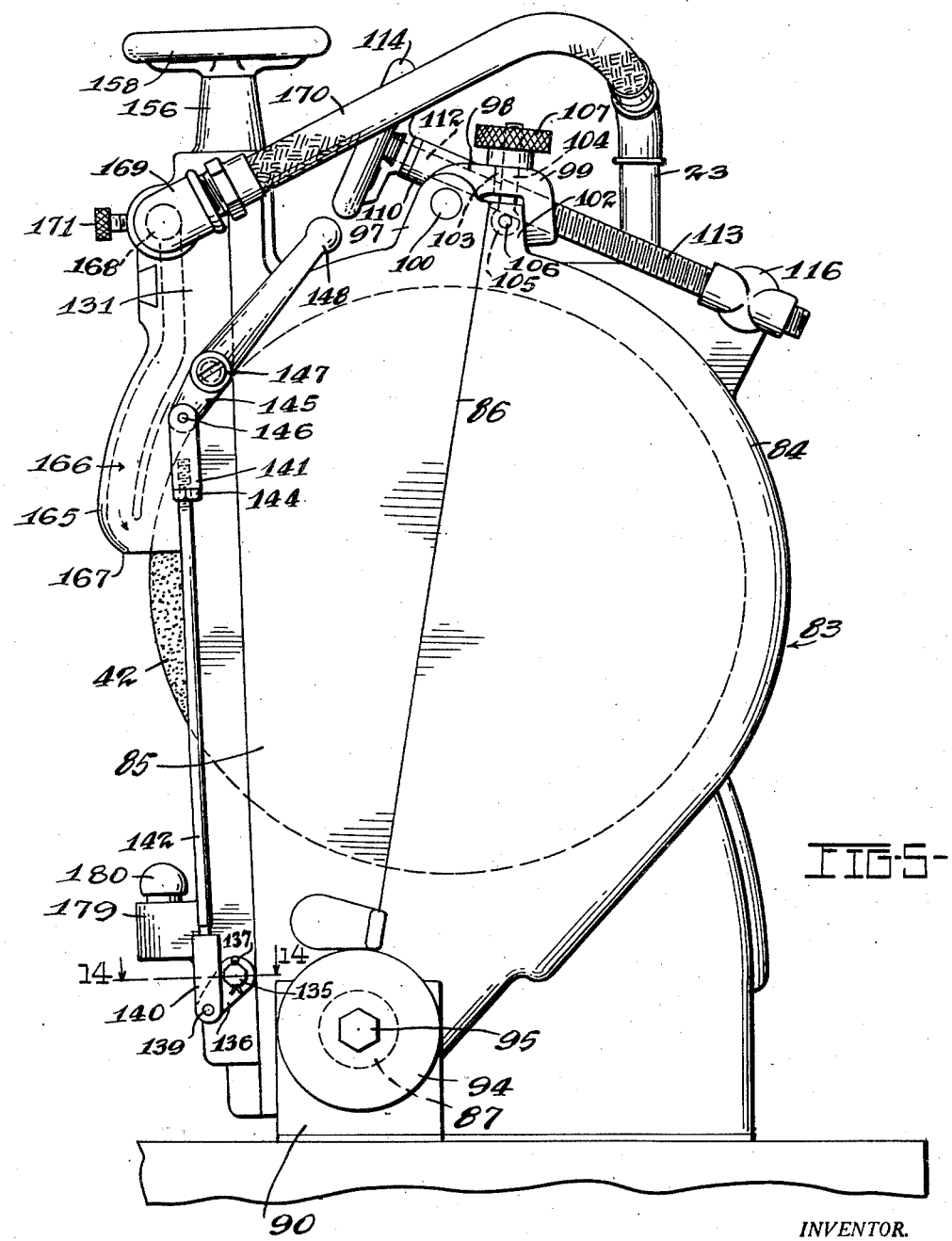

May 15, 1951 E. C. OLIVER 2,552,645
GRINDING MACHINE
Filed Sept. 24, 1945 6 Sheets-Sheet 6
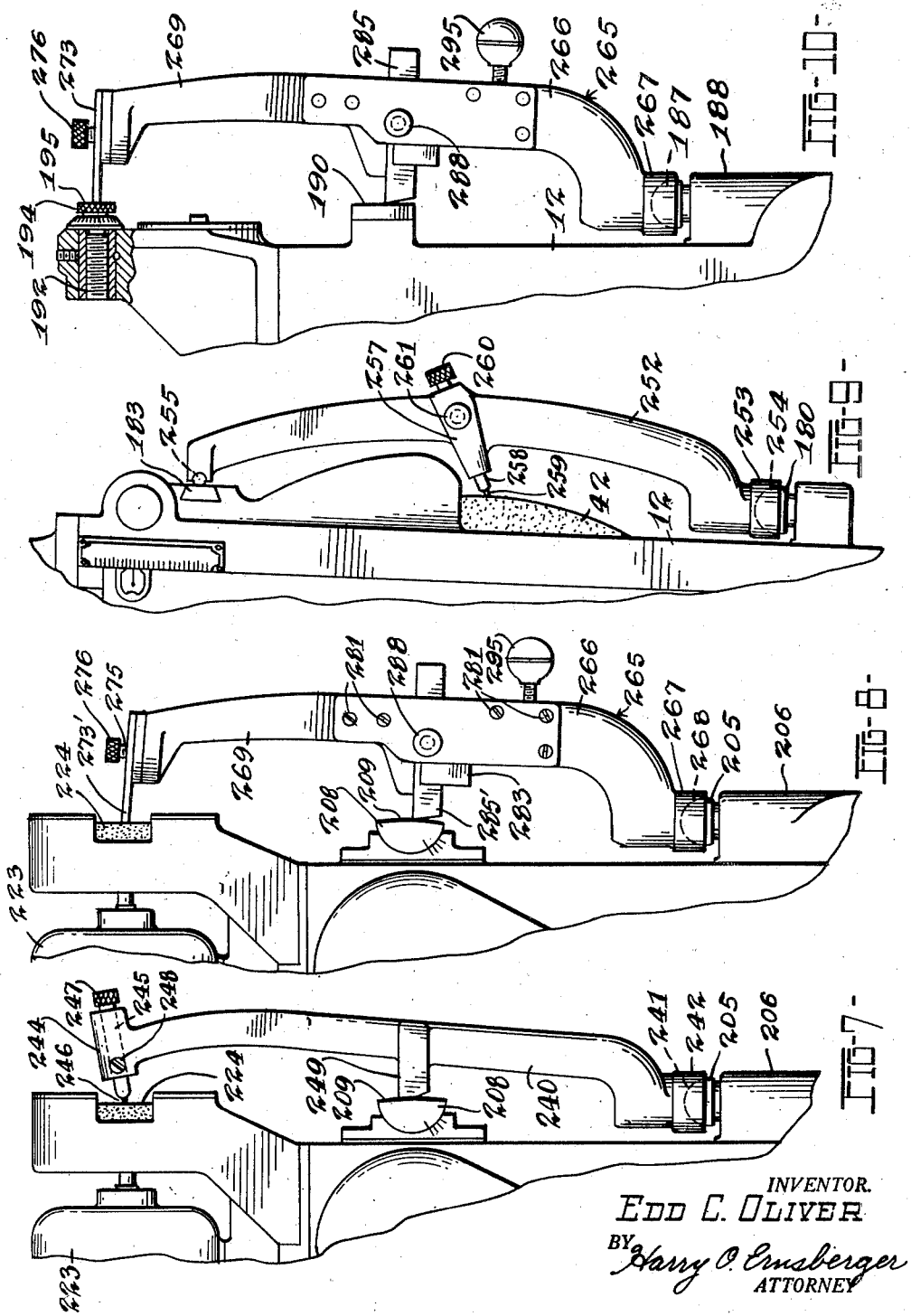
INVENTOR.
EDD C. OLIVER
BY Harry O. Ernsberger
ATTORNEY Patented May 15, 1951

2,552,645

UNITED STATES PATENT OFFICE 2,552,645

GRINDING MACHINE

Edd C. Oliver, Adrian, Mich.; Genevieve R. Oliver, executrix of said Edd C. Oliver, deceased, assignor to Genevieve R. Oliver, Adrian, Mich.

Application September 24, 1945, Serial No. 618,244

14 Claims. (Cl. 51—100)

This invention relates to grinding machines and more especially to a grinding machine for forming or configurating tool bits to predetermined profiles and for sharpening form tool bits to maintain their predetermined shapes or profiles as may be required for various types of cutting tools or bits and character of work upon which machining operations are to be performed.

The invention comprehends the provisions of a machine equipped with rotary grinding means and arranged whereby templates of the tool configuration or profile may be formed upon the machine, and a template configurated to a master tool form utilized to produce a form tool or tools therefrom by grinding.

The invention embraces the provision of a machine embodying a template producing means, a gaging means for determining or predetermining the relative positions of a template and forming tools which are mounted in a suitable fixture or holder, for gaging or pre-setting a grinding wheel dressing device, and a grinding means for forming or sharpening preformed tool bits from a template.

Another object of the invention resides in the provision of a machine wherein a peripheral curved surface of a grinding wheel is utilized for grinding form tools and wherein the proper angle of relief or clearance for the tool is established and maintained during tool forming and regrinding operations.

Another object of the invention resides in an arrangement wherein the peripheral or curved face of surface of a grinding wheel is utilized for grinding or configurating form tool bits or cutters and simultaneously imparting the proper angle of relief thereto, and which embodies means for adjusting elements of the mechanism to compensate for wear of the grinding wheel so that the relief or clearance angles of tools ground on the machine will be maintained substantially of the proper angle irrespective of the wear and subsequent reduction in the diameter of the grinding wheel. Another object of the invention resides in the provision of tool grinding or dressing machine having adjustable means whereby different angles of relief or clearance may be imparted to a form tool bit by adjustment of means which supports the tool holder or fixture.

A further object of the invention resides in the combination in one instrumentality of gaging means for predetermining the relative relationship of various elements associated with the machine, of means for producing templates for reproducing form tool shapes, and means for grinding tool blanks to predetermined form or sharpening worn tool bits.

Another object is the provision of a machine arranged to produce a template from a master tool in which the template form is greatly enlarged over the size of the master tool and wherein such enlarged template is utilized in grinding or forming the finished tool bit whereby greater accuracy of tool formation is assured and errors reduced to a minimum.

A further object of the invention resides in a gaging and indicating device arranged to inform the machine operator of the proper setting of the tool or tool blank with respect to the grinding wheel whereby through simple adjustments of the tool supporting means with respect to the grinding wheel for proper relief angle may be imparted to the tool by the grinding operation irrespective of the wear of the grinding wheel.

Still a further object of the invention is the provision of a grinding machine and tool holding fixture so correlated that a form tool may be ground upon the wheel so that various angular positions of the tool bits, with respect to the grinding wheel, may be attained in forming tool bits with various shapes of profile or configuration.

A further object of the invention resides in the provision of a grinding machine not only adapted for sharpening of tool bits which have become worn but which may be used to configurate or duplicate any number of tools of the same shape through the use of a template of the configuration of the master tool.

Another object is the provision of means for dressing a grinding wheel at the locus on the wheel which is engaged by the profile or cutting edge of the tool bit to be formed or re-sharpened so as to maintain the proper relationship between wheel truing and tool forming or grinding operations.

Further objects and advantages are within the scope of this invention such as relate to the arrangement, operation and function of the related elements of the structure, to various details of construction and to combinations of parts, elements per se, and numerous other features as will be apparent from a consideration of the specification and drawing of a form of the invention which may be preferred, in which:

Figure 1 is a front elevation of a machine of my invention;

Figure 2 is a vertical sectional view through the machine, certain parts being shown in full lines for purposes of illustration;

Figure 3 is a top plan view of the machine, certain parts being shown in section for the purposes of illustration;

Figure 4 is a side elevational view of the upper portion of the machine;

Figure 5 is a view of the opposite side of the upper portion of the machine;

Figure 6 is an enlarged front elevation view of a gaging device forming part of the invention;

Figure 7 is a view illustrating a wheel dressing device as utilized in dressing the template forming wheel;

Figure 8 is a view showing a tool bit and template fixture and illustrating a template forming operation;

Figure 9 is a view showing the means and method of dressing or truing the main grinding wheel;

Figure 10 is an elevational view of the tool holder shown in Figure 4 illustrating a use of the gaging device;

Figure 11 is a rear view of the tool and template holder shown in Figure 10;

Figure 12 is a top plan view of the tool and template holder;

Figure 13 is an isometric view illustrating a type of form tool bit provided with both relief and rake angles, and Figure 14 is a fragmentary sectional view taken substantially on the line 14—14 of Figure 5.

It is to be understood that while the machine of my invention is particularly adaptable for producing templates and forming or shaping form tool bits as well as worn tool bits and the like, it is to be understood that I contemplate use of my invention wherever the same may be found to have utility.

Referring to the drawings in detail, the machine is inclusive of a frame 10 which comprises in the embodiment illustrated, a base or pedestal 11, an intermediate frame portion 12, the latter supporting an upper frame element 15, the latter being secured to the intermediate portion by means of screws 16, or by welding or other suitable means, the intermediate portion 12 being secured to the pedestal 11 by screws (not shown) or other suitable means. The base or pedestal 11 is provided with a transverse wall 19 which forms with certain outer walls of the pedestal, a reservoir or settling chamber 20, and a second reservoir or chamber 21 in which is disposed a fluid circulating pump 22. The pump 22 is connected to a tube 23 for conveying a suitable fluid to the surface of the grinding wheel and on to the tool bit being ground for cooling purposes, and to convey cuttings and abraded material away from the wheel.

The intermediate portion 12 of the frame structure is formed with a table or trough portion 26 which is bounded at its periphery by an upwardly extending flange 27, the table serving to receive the cooling fluid after the discharge of the fluid upon the grinding wheel. Ribs or ridges 28 are integrally cast with the table portion 26 and flange 27 to subdivide the fluid receiving table into a plurality of shallow pockets, the ribs functioning to retain metal cuttings and wheel dust resulting from grinding operations and which are entrained in the cooling fluid and carried to the table 26, the cuttings and dust remaining in the pockets formed by the ribs 28. A fluid discharge opening 30 as shown in Figure 2 is formed in the table 26 which is surrounded by an upwardly projecting wall 31 providing a fluid discharge passage from the table 26 into the settling tank or reservoir 20. As the wall 31 projects slightly below the upper edges of the ribs 28, fluid from the table 26 above the level of walls 31 will discharge through opening 30, but fluid will always be maintained in the table 26 to a depth determined by the upper edge of the projecting wall 31. A baffle or cap 33 is disposed above the opening 30 so as to prevent the fluid from the grinding wheel passing directly through the discharge opening 30, the baffle 33 directing the fluid into the table 26 where a substantial amount of the metal cuttings and grinding wheel dust may be collected in the pockets formed by ribs 28.

The frame element 15 is integrally formed with a substantially cylindrical portion 36 within which is disposed anti-friction bearings 37 and 38, preferably of the taper roller type. Journaled upon bearings 37 and 38 is a shaft 39 which is formed with a tapered portion 40 adapted to receive and support a grinding wheel 42, the latter being disposed between two discs 43 and 44, a nut 45 being threaded on a tenon 46 formed on the end of the shaft 39 and engageable with the disc 44 to hold the grinding wheel assembly upon the shaft. A shaft sealing means (not shown) surrounds the shaft 39 and is contained within an enclosure 48 shown in Figure 2 to prevent escape of lubricant from the bearing 38. The shaft 39 is provided with threaded portion 49 adapted to receive a nut 50, the latter being engageable with one of the bearing races forming a part of the anti-friction bearing 38 to restain the shaft against endwise movement in its bearings. A lubricant sealing means (not shown) is contained within a shroud or closure 53 to prevent escape of the lubricant from the chamber 54 formed between the bearings 37 and 38. Lubricant is supplied automatically to the chamber 54 through an opening 55 which leads to a gravity feed oil-cup arrangement 56, shown in Figures 3 and 4.

Fixedly mounted upon a reduced portion 59 of shaft 39 is a multi-grooved wheel or sheave 60, the latter being connected by means of a plurality of power transmission belts 61 to a second sheave or multi-grooved pulley 62, the latter being mounted upon a shaft 63 which is driven by an electric motor 64 or other source of power, the motor being mounted at the rear of the grinding machine as shown in Figure 3.

Also mounted upon the motor shaft 63 is a single grooved pulley 66 which is connected by means of a power transmission belt 67 to a second grooved pulley 68, the latter being fixedly mounted upon a shaft 69 forming a part of the fluid pump construction 22. The pump shaft 69 is journaled upon suitable anti-friction bearings (not shown) mounted in a hollow boss portion 70 and in a cylindrical portion 71 of the pump housing. The pump housing is provided with a flange portion 72 which is secured to a side wall of the pedestal 11 by screws or other suitable means (not shown). The pump housing has an enlarged hollow portion 75 forming a chamber within which is disposed a pump impeller 76, the pump chamber being closed by means of a cover 77 in which is provided a central opening 78 for the admission of fluid from reservoir 21 into the impeller chamber. The motor 64 transmits power through pulleys 66, 68 and belt 67 to rotate the impeller 76 and convey fluid through the tube 23 to a point adjacent the grinding wheel where the grinding is performed. The motor 64 simultaneously rotates the grinding wheel 42 and the fluid pump impeller 76. The sheave wheels 60, 62, the pulleys 66, 68, and the power transmission belts 61 and 67 are preferably enclosed in a suitable housing 81 which is arranged to be removably secured to the frame of the machine for purposes of inspection.

As particularly shown in Figures 4 and 5, the grinding wheel 42 is enclosed within a suitable housing 83 fabricated in two sections 84 and 85, the elements or sections 84 and 85 being in engagement at 86 as shown in Figure 5. Both of the sections 84 and 85 are mounted for pivotal movement upon a shaft 87 as shown in Figure 2, the sections being arranged for limited pivotal movement about the axis of the shaft. The section 84 is provided with integral depending ear portions 88 which are formed with aligned openings to receive the shaft 87. The section 85 is formed with a boss portion 89 which is disposed between the depending ears 88 and is bored to receive the shaft 87. The shaft 87 is supported at one end upon an apertured boss 90 which is secured by screws or other suitable means (not shown) to the upwardly extending projection 92 formed on the table 26, the opposite end of the shaft extending into a bore in a boss portion 91 formed on frame member 15, the shaft 87 being held in the boss portion by means of headless set screws 93. The depending ear portions 88 and the boss portion 89 of section 85 are held in assembled relationship by means of a cap 94 which is secured to the shaft by means of a screw 95 threaded into an opening formed in shaft 87.

Means are provided in order to normally secure and retain the sections 84 and 85 in close relationship as shown in Figure 5. To this end section 85 is provided with an upwardly extending boss portion 97 which is bifurcated to accommodate the portion 98 formed on a locking means or lug 99 shown in Figure 5. The portions 97 and 98 are provided with aligned openings to accommodate a pintle or shaft 100 about which the locking means or lug 99 is arranged for swivel movement. The locking means 99 is of L-shaped configuration as shown in Figure 5, the inner surface of one leg thereof being adapted to engage and coincide with the outer surface of a projection 102 formed on the section or element 84. The locking means 99 is provided with a slot or kerf 103 as shown in Figure 3 to accommodate a threaded member or screw 104. The screw 104 is provided with an eye 105, the latter adapted to receive a pin 106 about which the screw 104 is arranged for pivotal movement. A knurled knob or finger piece 107 is threadedly received upon the screw 104 in order to secure the locking means 99 in engagement with the projection 102 on the section 84.

The sections 84 and 85 form an enclosure or housing 83 which encloses the grinding wheel 42. For purposes to be hereinafter explained, the sections 84 and 85 are adapted for pivotal movement about the axis of shaft 87. The shaft 100 extends laterally of the boss portion 97 as shown in Figure 2, the extending portion thereof adapted to receive a member 110, the latter being secured to the shaft by means of a set screw 111. The member 110 is provided with a bore, the axis of which is substantially at right angles to the axis of shaft 100, and is adapted to receive a tenon portion 112 formed on a threaded member or rod 113. A projecting portion of the tenon 112 is adapted to receive a suitable hand wheel 114 for manually rotating the threaded member 113. Mounted upon the threaded portion of member 113 is a member or nut 116 as shown in Figure 3, member 116 being provided with a laterally extending tenon 117 which is received in a smooth bore formed in a frustro-conically shaped boss 118 formed upon a relatively stationary plate or element 119. As shown in Figure 2, the plate or element 119 is fixedly secured to the frame portion 15 by means of screws 120 or other suitable securing means. The tenon 117 is provided with a reduced threaded extension adapted to receive a nut 121 for retaining member 116 in assembled relation with respect to the boss 118. It will thus be apparent that by manipulation of the hand wheel 114 causing rotation of screw 113, the latter being threaded into member 116, will move member 110 with respect to member 116 and plate 119, thus moving the sections 84 and 85 therewith about the axis of shaft 87 as a pivot or journal.

Locking means are provided for securing the sections 84 and 85 in adjusted position. The plate 119 is provided with an arcuate slot 121 and the section 85 is provided with a boss 122 provided with a threaded opening in alignment with the arcuate slot and adapted to receive a threaded member 123 which is fixedly associated with member 124, the latter having a manipulating handle 125 as shown in Figures 2 and 4. Thus by moving the handle 125 a release or friction locking action is obtainable between the juxtaposed surfaces of section 85 and plate 119.

The invention is inclusive of means for adjusting a support for the tool holder and template carrier, and a wheel dressing means relative to the grinding wheel 42 for purposes to be hereinafter explained. The forward portion of section 85 is formed with a tang 128 as shown in Figure 3 which has chambered or angularly arranged side surfaces 129 and 130 which provide ways or suitable bearing surfaces for slidably supporting a member 131. Disposed between member 131 and surface 130 is a longitudinally extending gib or gib-key 132, the latter being arranged for engagement with the tang 128 to securely retain or lock the member 131 in adjusted position. Locking means is provided for lateral engagement with the gib 132, which is inclusive of a threaded member 134 extending into a threaded opening in the member 131, as shown in Figure 14. The member 134 is provided with a polygonal portion 135 to receive an arm 136 having a correspondingly shaped opening to snugly fit the portion 135, the arm 136 being retained on the threaded member 134 by means of a cotter key 137. Secured to the extremity of arm 136 by means of a pin 139 is a bifurcated member or clevis 140 which is connected to a second clevis 141 by means of a rod or connecting link 142. The upper end of rod 142 is threaded into the bight portion of the clevis 141 for purposes of adjustment, and is locked in adjusted position by means of lock nut 144. The clevis 141 is connected to an end of a lever or arm 145 by means of a pin 146, the lever 145 being pivoted or fulcrumed upon a screw 147 threaded into an opening formed in a boss associated with the member 131. The lever 145 terminates at its other end in a laterally extending handle or manipulating portion 148. Thus by moving the arm 145 in a clockwise direction about the axis of the fulcrum or screw 147, as viewed in Figure 5, the rod 42 will be elevated, rotating the screw or locking member 134 inwardly into forcible engagement with the gib 132 to cause the latter to frictionally engage the tang 128 and securely lock the member 131 in its adjusted position.

In order to prevent cooling fluid and abraded material entrained therein from reaching the surfaces 129, 130 and the gib 132, I have provided a pair of elongated members 150 formed of rubber or other suitable sealing material arranged in longitudinally extending grooves or kerfs formed in the juxtaposed surfaces of member or slide 131 and tang 128 as shown in Figure 3.

The member 131 is provided with manually operated means whereby the same may be adjusted in a substantially vertical direction with respect to section 85. The section 85, as shown in Figure 3, is formed with a bore extending substantially parallel with the tang 128 and in which is immovably disposed an internally threaded bushing 153. Threaded into the interior of the bushing 153 is a threaded member or screw 154 having an unthreaded tenon portion 155 extending upwardly through a bore formed in a cap or projection 156 having a flange portion 157 which is secured to the upper end of member 131 by means of suitable screws (not shown). A hand or manipulating wheel 158 is fixedly secured to the tenon portion 155 of the threaded member 154 for rotating the latter in the threaded bushing 153. In view of the fact that the cap 156 is fixedly secured to member 131, rotation of the hand wheel 158, threading the member 154 into the fixed bushing 153 will cause member 131 to move longitudinally of the ways formed on tang 128.

As illustrated in the drawings, the member 131 is movable at a slight angle with respect to a vertical plane through the machine when a new or full size grinding wheel 42 is used. As the grinding wheel wears through use and thus becomes of lesser diameter, an adjustment of hand wheel 114 and threaded member 113 moves the member 131 and sections 84 and 85 about the pivotal axis of shaft 87, so that the angularity of the member 131 will vary with respect to a vertical plane through the machine as the grinding wheel 42 becomes worn down and subsequent adjustments of member 131 are made to compensate for such wear. A plate 160 is secured to one side of member 131 as shown in Figure 4, on which is inscribed a series of indicia 161 adapted to cooperate with an index line 162 inscribed on an adjacent plate fixedly secured to section 85. By means of an index line 162 and the indicia 161, the proper position of adjustment may be obtained for the support 131 by manipulating the hand wheel 158.

The forward portion of support 131 is formed with a projection 165 which is formed with a passageway 166 for the delivery of cooling fluid or coolant to the face of the grinding wheel at the point where tool grinding or work operations take place. The projection 165 is formed with a curved lip portion 167 for directing the cooling fluid on to the grinding wheel. The passage 166 communicates at its upper end with a manifold 168, the latter being connected by means of a suitable fitting 169 with a flexible tube 170, the latter being connected to the tube 23 for conveying cooling fluid from the pump 22, shown in Figure 2. The tube 170 is made flexible to accommodate angular and vertical adjustments of member 131. The fitting 169 is secured to the slide 131 by means of a clamping screw 171. The manifold passage 168 is cylindrical and is arranged to accommodate a plunger or valve 172 which is slidably movable in the manifold in order to regulate or vary the amount or volume of cooling fluid delivered adjacent the surface of the grinding wheel. The plunger 172 is carried upon a stem or rod 173 which passes through an opening in an abutment or plug 174 which closes the end of the manifold 168. Secured to the outer end of the stem 173 is a manipulating knob 175 for moving the plunger longitudinally in the passage 168. The plunger or valve 172 may be maintained in adjusted position through the manipulation of a locking screw 176.

The member 131 is formed with a ledge 179 which carries a support 180 upon which may be supported the wheel dresser, template and tool holder. In the embodiment illustrated, the support 180 is of substantially semi-spherical configuration as shown in Figure 4, but other types or configurations of support may be utilized without departing from the spirit of the invention. The support 180, in the form shown, is provided with a tenon 181 which is pressed into a bore or cylindrical opening formed in the ledge 179. The forward portion of the slidable support 131 above the projection 165 is provided with a slot within which is disposed a hardened block or face plate 183 used as a working face or guide as hereinafter explained in detail, the face plate being securely held in place by means of screws 184.

A gaging means is provided for performing several functions, as for example, determining the amount of metal to be removed in a grinding process, for determining the relative position of the template and tool to be ground, the relative position of wheel dressing tool and for determining master tool positioning in the making of templates. The gaging means is inclusive of a support 187 identical with the support 180 and which is carried upon a projection 188 formed upon the machine frame as shown in Figures 1 and 2. As particularly shown in Figure 1 there is disposed above the support 187 a gaging surface or plate 190, the plate being preferably of hardened material ground with a smooth surface, and which is held in place on the machine frame by means of screws 191. Mounted upon a projection or bracket 193 directly above the plate 190 is an adjustable gage element 194 in the form of a micrometer screw, the threaded portion 192 thereof cooperating with a threaded bushing contained within projection 193 so that rotation of member 194 will move the gage surface portion 195 toward or away from bracket 193 depending upon the direction of rotation of the micrometer screw. The micrometer arrangement is provided with indicia 196 indicating on a rotary scale the longitudinal distance through which the screw may move upon relative rotation thereof. For example, the distance between each of the graduations or indicia 196, as shown in Figure 6, may each indicate a longitudinal movement of the micrometer screw of one thousandth of an inch or some other comparatively minute unit of measure. As hereinafter explained, the support 187, the gage plate 190 and the micrometer screw gaging device 194 are associated in pre-determined relationship to perform certain definite functions.

Also mounted on the projection 193 carried by the machine frame is a relatively stationary annular member or ring 197, and disposed centrally of annular member 197 is a circular disc 198, the latter being journaled for rotation upon a suitable shaft (not shown) extending into a bore in the projection 193, the circular disc being provided with a manipulating knob 199. The disc 198 is provided with one set of indicia or graduations 200 indicating various widths of form tool bits, the disc, in addition, bearing a second series of spaced indicia or graduations 201 which are adapted for interpolation or use with the graduations 202 formed on the annulus or member 197. The indicia 161, formed on plate 160 as shown in Figure 4, are contemporary with the graduations 202 contained on the annulus 197, the purpose and function of the several sets of indicia or graduations being hereinafter explained in detail.

The machine of my invention is inclusive of means especially arranged and adapted for rapidly and accurately producing templates for forming tool bits and for re-sharpening worn tool bits. This arrangement is inclusive of a support 205 mounted on a projection 206 integrally formed on the machine frame, the support 205 being of the same character as supports 180 and 187.

Positioned above the support 205 is a gaging surface or block 208 which is formed with a curved or arcuate working or gaging face 209 which simulates the curved peripheral contour or surface of the grinding wheel 42. The gage block 208 is formed with a semi-spherically shaped rear surface 210 which rests in a reciprocally shaped cylindrical surface 211 formed in a bracket 212 secured to the machine frame by means of screws 214. The block 208 is arranged to be held in adjusted position by means of a clamping screw 215 threaded into an opening in the block 208, to secure the block 208 in adjusted position. The block 208 is provided with an index 216 which is adapted for cooperation with a series of indicia 217 impressed in the bracket 212 for determining the relative position of adjustment of the block 208. The purpose of the adjustable gage block 208 is to provide a means to compensate for the rake angles during grinding operations upon form tools provided with rake angles as indicated at B in Figure 13 as hereinafter explained in order to secure an accurate profile or cutting edge of the form tool from a template.

Disposed upon the frame of the machine above the support 205 and the gage block 208 is a member 220 provided with a rearwardly extending tang 221 upon which is slidably disposed a motor support bracket 222 carrying an electrically operated motor 223 or other motive means for driving a template grinding wheel 224. As particularly shown in Figure 4, the tang of member 220 is bored to receive a threaded bushing 226 which is arranged to accommodate a screw 227. The screw 227 is provided with a reduced tenon portion 228 journaled in a suitable opening formed in a bracket 229 which is secured to the motor supporting bracket 222. The projecting portion of tenon 228 is fixedly secured to a manipulating or hand wheel 230. By manipulating the hand wheel 230, the screw 227 may be rotated to move the bracket 222, motor 223 and grinding wheel 224 longitudinally of the tang 221 to bring the grinding wheel 224 to the proper template forming position. It should be noted that the grinding wheel 224 is of cup-like configuration and is securely mounted upon the motor shaft 231. A suitable shroud 232 surrounds the grinding wheel and forms a part of the motor supporting bracket 222. A frontal plate or guard 233 is secured to the shroud 232 as an additional closure for the grinding wheel, the plate 233 being formed with an open ended slot 235 to facilitate access to the grinding wheel for carrying on template grinding operations.

The arrangement of my invention is inclusive of a means for truing the template wheel as shown in Figure 7. The template wheel truing device includes a fixture or holder 240, which has a semi-spherical socket or recess 241 in a boss 242 formed on the lower end of the fixture or member 240, the socket adapted to fit over the support 205 during wheel truing operations. The upper extremity of the fixture 240 is formed with a boss 244 having an opening arranged to receive a member 245 which is provided at its forward extremity with a tool dressing diamond 246 or other hardened wheel dressing element suitably adapted to "true up" the template grinding wheel 224. The member 245 is provided with a knurled finger piece 247 for adjusting the dressing diamond with respect to the member 240, the adjustment being maintained by means of a locking screw 248. The arm 240 is formed intermediate its ends with a gage portion or abutment 249, the forward face of which is adapted to engage the arcuate face 209 of the gage block 208 serving as a stop or limiting means to determine or finalize a template wheel dressing operation by limiting the inward movement of the truing diamond 246.

As illustrated in Figure 9, there is provided a means for truing or dressing the main grinding wheel 42. The arrangement is inclusive of a fixture or holder 252 having a boss 253 at its lower extremity formed with a semi-spherically shaped socket 254 adapted to fit the supports 180 and 187. The upper extremity of the fixture 252 is provided with a hardened gaging block 255 which is adapted to engage or contact the surface plate 183. The mid portion of the fixture or holder 252 is integrally formed with a boss portion 257 which is bored to receive a member 258 which is provided at one extremity with a wheel dressing diamond 259, and at its other extremity with knurled manipulating knob 260. The boss portion 257 is bored and threaded to receive a locking member 261 for securing the diamond carrying member 258 in adjusted position. The engagement of the member or block 255 with the surface plate 183 serves to limit the innermost position of the diamond 259 and thereby determine the amount of abrasive material removed from the grinding wheel 42.

The arrangement of my invention is also inclusive of a combination tool bit holder or fixture 265 having a template support which is shown in Figures 4, 8, 10, 11 and 12. The device or fixture 265 is inclusive of a member 266 which is formed at its lower end with a boss 267 provided with a semi-spherically shaped recess 268 which is adapted to fit over any of the supports 180, 187 and 205 for purposes to be hereinafter explained. A member 269 is formed at its upper end with pad portion 270 having a machined upper surface 271 and a tang 272 projecting above the machined surface 271 as shown in Figure 11. The surface 271 is adapted to support a removable template 273 which is formed with a groove adapted to take over and snugly fit the tang 272. The tang 272 is provided with a pair of upwardly extending pins 274 as particularly shown in Figure 12, and the template 273 is formed with openings which register with the pins 274. The tang 272, cooperating with the groove in the template 273, and the pins 274 extending into the openings in the template, serve to accurately position the template upon the holder 265. The template is held in place upon the holder by means of a threaded member 275 having a knurled finger piece 276 for manipulating the template retaining screw. It is to be understood that many different shapes of templates may be employed with the fixture 265 corresponding to similarly shaped form tool bits which are to be ground. Templates may be quickly interchanged by simply removing the screw 275.

Portions of members 266 and 269 are adapted to be fixedly connected together by means of plates 280, the latter being secured to members 266 and 269 by means of screws 281. The members 266 and 269 are spaced to receive a tool bit carrying block or member 283 formed with a slot 284 which is adapted to receive and accommodate a tool bit 285. The tool supporting block 283 is provided with a transverse kerf or slot 286 through which extends a locking member or screw 287 which is threaded into an opening in one of the plates 280 as shown in Figure 11. The locking member 287 is formed with a knurled finger piece 288 to facilitate manipulation of the locking means. When the tool bit 285 is contained in the supporting block 283 and mounted in the fixture 265, the upper surface of the tool bit engages the surface 290 on member 269 to position the tool in the holder. A cam member 291 disposed beneath the tool supporting block 283, is pivotally supported upon a pin 292. A threaded member 294, having a manipulating portion 295, is threaded into a suitable opening in member 266 and is arranged to engage a depending portion 296 forming an integral part of the cam 291. As shown in Figure 4, a clockwise manipulation of the threaded member 294 will move the latter into engagement with depending portion 296 to force the cam contour of cam 291 into forcible engagement with block 283 to securely lock the tool bit 285 in proper position.

The machine of my invention performs several functions. The machine is inclusive of means or mechanisms for dressing the template wheel, producing a template from a master tool bit form, determining the amount of stock to be removed in the grinding operation, determining the gaging and proper wheel dressing operations and of finally grinding or reproducing the template form in a tool bit with uniform relief or clearance angle throughout the complete tool bit form or contour as well as to grind any number of tool bits according to the template or pattern and to re-grind or re-sharpen used form tool bits.

The operations of producing the finished form tool bit including the several steps of dressing the wheels, forming the template and producing a form tool bit will now be described. The first operation is that of properly setting the wheel dressing diamond 246 carried by holder 240 in order to properly dress or "true up" the template producing wheel 224. To this end the holder 240, shown in Figure 7, is placed upon the gaging support 187 with the positioning or abutment bar 249 in engagement with the surface or positioning plate 190, with the wheel dressing diamond 246 adjusted until it contacts the outer face 195 of the adjustable gaging element 194 when the micrometer screw 194 is set at zero. This adjustment places the face of abutment 249, the tip of the diamond or dressing tool 246 and the center of the support 187 in a common plane. The screw 248 is then drawn up to lock the diamond supporting member 245 in proper adjusted position. The holder 240 is then shifted from the support 187 onto the support 205 and the motor 223 for rotating the template grinding wheel 224 is then energized and adjusted by means of hand wheel 230 until the template wheel 224 is in a position to be engaged by the dressing diamond. The machine operator then oscillates the holder 240 about the spherically shaped support 205 to bring the dressing tool 246 into engagement with the template forming wheel 224, at all times maintaining the socket 241 in full engagement with the support 205. The diamond 246 will then effectively "true up" or dress the template wheel 224 to an extent limited by engagement of the stop or abutment 249 with the gaging block 208, as shown in Figure 7. When the abutment 249 and block 208 have fully engaged to the extent permitted by said stop means, the wheel dressing operation is completed.

The next operation is to produce a template to a configuration determined by that of a master or pattern tool bit. This operation is shown in Figure 8. In producing a template, a template blank 273' is positioned upon the upper surface 271 of the holder 265, the template blank having been previously provided with the grove and openings to accommodate the tang 272 and the positioning pins 274 associated with the holder. The manipulating screw 275 is tightened by manipulation of the finger piece 276 to secure the template blank in place. A master form tool bit 285' from which the template is to be made is inserted in the tool supporting block 283 and the retaining screw 287 turned to secure the master tool bit in place. The knob 295 is then turned inwardly, as viewed in Figures 4 and 5, to bring the cam 291 into locking engagement with the tool carrying block 283, thus securely retaining the master tool 285' in proper position, as shown in Figure 8. Before the template blank 273' is formed to simulate the configuration of the master tool 285', the tool 285' is so spaced from the surface 209 of the gage block 208 as to permit the template blank to engage the template grinding wheel 224. The grinding or forming of the template progresses until the master tool form 285' completely engages the gage block 208 in all angular positions. During the grinding, the operator swivels the holder 265 upon the support 205 so that all portions of the template necessary to reproduce the tool form are brought into engagement with the template producing wheel 224. After the template blank 273' has been ground to a configuration simulating the form tool contour of master tool 285', the drawings showing the duplication or simulation of a round nose form tool, such template being illustrated in Figure 12, the master tool bit 285' is removed from the holder by manipulation of the knobs 295 and 288, after which a tool bit blank 285 is inserted in the tool carrying block 283.

The next operation consists in properly positioning a diamond in the holder 252 for dressing the main grinding wheel 42. To accomplish this, the machine operator places the holder 252 on the support 187 with the gaging block 255 in engagement with the face 195 of the micrometer screw 192 with the latter set at zero. The member 258 is then adjusted until the diamond or dressing tool 259 engages the gage block 190 and the member 258 locked in position by locking member 261. This operation brings the gaging surface of rod 255, the tip of the dressing tool 259 and the center of support 187 in a common plane.

The next operation resides in dressing or "truing up" the main grinding wheel 42 preparatory to form grinding tool bits. The truing operation is illustrated in Figure 9 wherein the diamond 259 engages the peripheral or arcuate face of the grinding wheel. The operator first adjusts the slide or member 131 by means of the handwheel 158 until the proper indicia on chart 161 is in registration with the index 162 corresponding to the angle of relief or clearance to be formed on the tool bit. This relationship is determined by manipulation of the movable disc 198 shown in Figure 6 for tools of different widths and clearance angles as hereinafter explained in detail. By this means of adjusting the slide 131, the wheel dressing tool 259 will engage the grinding wheel at the exact zone or locus that the form tool profile or cutting edge will engage the wheel. This is essential in order to secure accurate tool formation as the wheel dressing operations and tool forming or grinding operations are performed with the holders 252 and 265 arranged for movement about the geometric center of the support 180. The operator places the holder 252 in engagement with the support 180 and the abutment 255 carried by the holder engages the surface plate 183 during the wheel truing operation, the block 255, engaging the surface plate 183, serves to limit the amount of material to be removed from the grinding wheel.

The operator now fits the holder 265 into engagement with the support 187 as shown in Figure 10, with the template 273 disposed adjacent the face 195 of the micrometer screw. If it is determined, for example in re-sharpening a worn tool bit to remove ten thousandths of an inch from the tool bit 285, the gage 194 and screw 195 will be rotated to the position indicating ten thousandths of an inch. The operative edge of the template 273 is then brought into engagement with face 195 of the gage and the tool bit 285 moved until its extremity is moved into engagement with positioning plate or surface 190 the tool bit being held in place by manipulation of the finger pieces 288 and 295.

Preparatory to grinding the tool blank 285 into a finished form or to re-sharpen a worn tool bit, it is necessary to adjust the member 131 shown in Figure 4 to the proper position to provide the desired relief angle A for the tool, the relief angle of a tool being illustrated in Figure 13. This is determined in the following manner; with particular reference to Figure 6 it is to be noted that the indicia 200 indicates the various widths of tool bits and that the indicia 201 on the disc 198 indicates the degree of relief or clearance angle for the tool bit. Thus, the proper graduation of the indicia 200, indicating the width of the tool to be formed is brought into registration with the zero index 203 shown in Figure 6. The setting of slidable member 131 is obtained by noting the letter position opposite the graduation of indicia 201 indicating the relief angle which it is desired to impart to the finished tool. The indicia 161 on the chart 160 secured to member 131 corresponds with the letter position 202 inscribed on the annular member 197. Therefore, in order for the operator to secure the proper position of slide 131, he simply moves the slide by means of a hand wheel 158 until the index line 162 is in registration with the proper letter index on chart 160 corresponding with the line on the annular member 197 opposite the index indicating the relief angle shown on the movable disc 198. In order for the operator to move the slide 131, the locking screw 135 must be in released position, that is backed away from engagement with the gib 132 shown in Figure 14. The released position of the screw and its actuating mechanism is illustrated in Figure 5. After the operator has moved the hand wheel 158 to secure the proper relative position of the slide 131 with respect to the grinding wheel 42, he locks the slide 131 in adjusted position by moving the handle 148 in a clockwise direction about the shaft 147 as a fulcrum, elevating clevis 140, 141 and the rod 142 to oscillate the arm 136 to rotate locking screw 134 into locking engagement with the gib 132. In this manner the slide 131 may be securely locked during grinding operations.

The operator then positions the fixture 265 as shown in Figure 4 with the same in engagement with the support 180 and maintains the tool 285 in engagement with the peripheral face of the grinding wheel 42 until the form of the template 273, in engagement with the surface plate 183, is duplicated by grinding the tool bit 285. After the completion of the grinding operation shown in Figure 4, the finished tool bit 285 may then be removed from the fixture 265 by manipulation of the finger pieces 285 and 288 to release the locking screws 294, 287 and release the cam 291. Any number of duplicate form tools may be ground or produced by repeating the grinding operation illustrated in Figure 4, after having fit the successive tool blanks in the proper position in the holder or fixture as illustrated in Figure 10.

During the grinding operation, a suitable coolant or cooling fluid is circulated by means of the pump 22 through the tube 23, manifold 168 and the downwardly extending passage 166, the coolant being turned at the end of passage 166 directly upon the grinding wheel 42 in the area where the grinding takes place. The rate or amount of coolant delivered to the surface of the wheel may be regulated by adjusting the valve plunger 172 through the medium of the finger piece 175, the locking screw 176 serving to hold the valve 172 in proper or adjusted position.

The arrangement of my invention produces an enlarged form of template, as illustrated, the template being twice the size of the form tool contour so that when the template is used for reproducing form tool bits or for regrinding used bits, the form tool contour will be extremely accurate through the use of such an enlarged template.

The arrangement of the invention provides for a simple yet effective manner of utilizing the peripheral curved face of a grinding wheel to obtain the angle of relief for form tool bits. The angle of relief may vary in different types and forms of tools, the various relief angles being obtained by adjusting the tool holder supporting means 131 in a substantially tangential direction with respect to the grinding wheel periphery. By mounting the tool holder supporting means so that the same is movable about the pivotal axis of shaft 87 the tool supporting means may be readjusted as the grinding wheel wears away to compensate for the reduced diameter of the wheel 42.

The block 208 which simulates a segment of the main grinding wheel 42 is radially adjustable about a point in the center of the arcuate face 209 thereof in order to provide a means for forming a template to accurately grind the proper profile or cutting edge upon a form tool 310 having a rake angle as indicated at B in Figure 13. This compensation for rake angle is accomplished when a template is made from a master tool, by tilting the block 208 an amount equal to the clearance angle A, shown in Figure 13, as indicated by the indicia 217. By this means the arrangement of my invention is adaptable for grinding form tools with or without rake angles, simultaneously retaining a substantially uniform relief angle throughout the contour of the formed tool. The arrangement herein described for obtaining relief angles by grinding tools with or without rake angles is attained without the utilization of gaging blocks or the like, thus insuring a high degree of accuracy and efficiency in producing or regrinding form tools and in which manner tools of the same contour may be duplicated with substantial uniformity and without error.

The arrangement of my invention is particularly usable for configurating straight line or convex cutting edge contours on form tools. It should also be noted that the surface of the tool bit engaging the periphery of the grinding wheel to produce the relief angle will be of slight arcuate configuration derived from the arc of the grinding wheel.

I have also found that it is desirable in forming templates for different widths to tool bits, to increase the length of the template over a predetermined standard lengh by an amount equal to the tool width to facilitate accurate formation of clearance or relief angles on tool bits. For example, a tool bit one quarter inch in width may be formed from a template three and one quarter inches in length, and in this proportion a tool three quarters of an inch in width would be formed from a template three and three quarters inches in length.

A splash guard (not shown) may be employed and positioned upon the table 26 in front of the grinding wheel 42 in order to direct the cooling fluid into the receiving table 26.

It is apparent that, within the scope of the invention, modifications and different arrangements may be made other than is herein disclosed, and the present disclosure is illustrative merely, the invention comprehending all variations thereof.

What I claim is:

1. In a machine of the character disclosed in combination, a frame; a grinding wheel journaled upon said frame; means for supporting a holder upon said frame whereby an implement carried by said holder is arranged to be brought into engagement with the arcuate periphery of the grinding wheel in a radial direction with respect to said wheel; means for shifting the position of the holder supporting means about an axis parallel to and spaced from the axis of said grinding wheel to compensate for wear of the grinding wheel; means for adjusting said holder supporting means in a direction tangentially of the grinding wheel and adjustable gaging means adapted to cooperate with the holder and implement for predetermining the relative position of the implement in said holder.

2. In a machine of the character disclosed in combination; a frame; a grinding wheel journaled for rotation upon said frame; a fixture arranged to carry a tool bit; said fixture having a socket formed therein; a member mounted upon said frame; means for effecting relative slidable adjustment between the member and the grinding wheel in a direction tangentially of the arcuate face of the wheel whereby to determine the relief angle to be formed on the tool bit; and means including a ball-shaped element adapted to fit the socket in the fixture associated with said member to support said fixture whereby the latter is capable of limited universal movement with respect to said member to bring variout points of the tool bit into engagement with the grinding wheel.

3. In a machine of the character disclosed in combination; a frame; a grinding wheel journaled upon the frame; a member pivotally mounted upon the frame and arranged for movement relative to the grinding wheel about an axis parallel with and spaced from the axis of rotation of the grinding wheel; a fixture; a fixture supporting element mounted upon said member and arranged for slidable movement relative thereto; means for locking said member in adjusted position; means for locking said element in adjusted position with respect to said member; said element having means for supporting said fixture whereby the same is arranged for limited universal movement with respect to said element.

4. In a machine of the character disclosed in combination; a frame; a grinding wheel journaled upon the frame; a member pivotally mounted upon the frame for movement relative to the grinding wheel; a tool bit holder; a holder supporting element slidably mounted upon said member for movement relative thereto in a direction tangentially of the periphery of the grinding wheel; means for adjusting and locking said member in adjusted position; means for adjusting and locking said element in adjusted position with respect to said member; said element being provided with a spherically shaped portion for supporting the holder whereby said holder is arranged for limited universal movement with respect to said element to bring various points of a tool bit carried thereby into engagement with the grinding wheel.

5. In a machine for grinding form tool bits, in combination, a frame; a grinding wheel journaled upon the frame; a tool bit holder having a socket formed therein; means including a spherically shaped element mounted for adjustment relative to said grinding wheel and arranged to fit the socket in and thereby position the tool bit holder whereby a tool bit may be brought into engagement with the arcuate peripheral face of the grinding wheel; said tool bit holder supporting means being slidably adjustable in a plane substantially tangentially of the peripheral face of the grinding wheel for varying the relief angle to be formed on the tool bit.

6. In a machine for grinding or shaping form tool bits, in combination, a frame; a grinding wheel journaled upon the frame; a tool bit holder; a housing substantially enclosing the grinding wheel; a tool holder supporting means slidably mounted upon said housing; said tool holder adapted to support a tool bit arranged to engage the arcuate periphery of the grinding wheel in a radial direction with respect to said wheel; said tool holder supporting means being slidably adjustable in a direction substantially tangentially of the grinding wheel whereby the relief angle formed on the tool bit may be determined by shifting the tool holder supporting means to cause the tool bit to engage the grinding wheel periphery in a different relative position with respect thereto.

7. In a machine for forming tool bits, in combination, a frame; a grinding wheel journaled upon said frame; a housing for the grinding wheel formed of two sections; said sections being pivoted to the frame; means for supporting a tool bit holder adjustably mounted upon one of said housing sections; a tool bit holder adapted to be removably supported upon said means; means for moving said housing sections about their pivotal support to compensate for wear of the grinding wheel; said tool holder supporting means being slidably adjustable tangentially of the grinding wheel to change the zone of engagement of a tool bit with the arcuate peripheral surface of the grinding wheel.

8. In a machine of the character disclosed in combination, a frame; a grinding wheel journaled upon said frame; a housing for said wheel formed of a pair of generally semi-circular separable sections; means for locking said sections together; said sections being pivotally supported upon said frame for movement about an axis parallel to and spaced from the axis of rotation of the grinding wheel; one of said housing sections being formed with a pair of ways; a member slidably disposed for movement along said ways; said member being provided with means to support an implement carrying fixture; and means including a threaded shaft cooperable with said housing sections for moving said sections about their pivotal support to adjust the position of said slidably supported member with respect to the periphery of the grinding wheel.

9. In a machine of the character disclosed in combination, a frame; a grinding wheel journaled upon said frame; a housing for said grinding wheel; a member slidably supported upon said housing for movement in a plane tangentially of the arcuate periphery of the wheel; an implement carrying fixture; means carried by said member for supporting the implement carrying fixture; means for moving said housing relative to said grinding wheel whereby said fixture supporting member may be moved toward or away from said wheel; means for conveying and directing a stream of cooling fluid on to said grinding wheel; said means including a fluid conveying duct formed in said slidable fixture-supporting member.

10. In a machine of the character disclosed in combination, a frame; a grinding wheel journaled upon the frame; a housing substantially enclosing said grinding wheel; said housing being pivotally supported upon said frame for movement about an axis substantially parallel to the axis of the grinding wheel; means for adjusting the position of said housing about its pivotal axis; means for locking said housing in adjusted position; an implement holder, and means carried by the housing for supporting the implement holder whereby the implement carried by the holder is adapted to be brought into engagement with the peripheral face of the wheel in a radial direction.

11. In a machine of the character disclosed in combination, a frame; a grinding wheel journaled upon said frame; a housing for said wheel including a pair of separable sections; means for normally securing said sections together; a member supported on one of said sections, said member and said member supporting section being formed with cooperating bearing surfaces whereby said member may be slidably moved relative to said section in a direction tangentially of the periphery of the grinding wheel; means on said member for supporting an implement carrying fixture; said housing sections being adjustable relative to said grinding wheel, and means for locking said housing sections in adjusted position.

12. In a machine of the character disclosed in combination, a frame; a grinding wheel supported upon said frame; a fixture arranged to carry a tool bit to be formed by engagement with said grinding wheel; a member; means for supporting said member for adjustment relative to said grinding wheel in a direction tangentially of the periphery of the wheel whereby to determine the relief angle to be formed on the tool bit; means for moving said member in a direction radially of said wheel to compensate for wear of the wheel, and means including a spherically shaped element on said member arranged to support the fixture for limited universal movement with respect to said member whereby various points of the tool bit may be brought into engagement with the grinding wheel.

13. An arrangement for forming relief upon form tool bits including in combination, a frame; a grinding wheel supported on the frame; a member movably mounted upon the frame; a tool bit supporting means mounted upon the member and adjustable in a direction radially of the grinding wheel to bring a tool bit carried thereby into engagement with the arcuate peripheral face of the grinding wheel to impart a relief configuration to the tool bit corresponding to the curvature of the grinding wheel face; a template carried by the tool bit supporting means for directing the tool bit into engagement with the arcuate face of the grinding wheel; and means for moving said member in a direction tangentially of the grinding wheel periphery to vary the angularity of the relief configuration formed on the tool bit.

14. In a machine of the character disclosed, in combination, a frame, a grinding wheel journaled upon the frame; an implement holder; a member pivotally supported upon the frame for adjustment about an axis substantially parallel to the axis of the grinding wheel; means for locking said member in adjusted position; means for supporting the implement holder upon said member, said member and said implement holder supporting means being formed with cooperating bearing surfaces whereby said implement holder supporting means is adapted for slidable movement with respect to said member, and manipulating means for effecting relative slidable movement of said implement holder supporting means relative to said member.

EDD C. OLIVER.

REFERENCES CITED

The following references are of record in the file of this patent:

UNITED STATES PATENTS

| Number | Name | Date |
| --- | --- | --- |
| 83,636 | Jeffers | Nov. 3, 1868 |
| 565,644 | Taylor | Aug. 11, 1896 |
| 568,545 | Phillippi | Sept. 29, 1896 |
| 1,049,619 | Stewart | Jan. 7, 1913 |
| 1,286,518 | Brassill | Dec. 3, 1918 |
| 1,332,009 | Sumbling | Feb. 24, 1920 |
| 1,377,884 | Heryngfel | May 10, 1921 |
| 1,386,741 | Sumbling | Aug. 9, 1921 |
| 1,638,450 | Ritz | Aug. 9, 1927 |
| 1,770,318 | McAndrew | July 8, 1930 |
| 1,783,540 | Hogg et al. | Dec. 2, 1930 |
| 1,868,266 | Woodsend | July 19, 1932 |
| 2,231,217 | Oliver | Feb. 11, 1941 |
| 2,381,034 | Bura | Aug. 7, 1945 |
| 2,375,620 | Bura | May 8, 1945 |